United States Patent [19]
Kahl et al.

[11] Patent Number: 5,723,518
[45] Date of Patent: Mar. 3, 1998

[54] AQUEOUS TWO-COMPONENT POLYURETHANE COATING COMPOSITIONS AND A METHOD FOR THEIR PREPARATION

[75] Inventors: Lothar Kahl; Bernd Klinksiek, both of Bergisch Gladbach; Dieter Schleenstein, Odenthal; Manfred Bock, Leverkusen; Nusret Yuva, Leichlingen, all of Germany

[73] Assignee: Bayer Aktiengesellschaft, Leverkusen, Germany

[21] Appl. No.: 779,103

[22] Filed: Jan. 6, 1997

Related U.S. Application Data

[63] Continuation of Ser. No. 448,870, May 24, 1995, abandoned.

[30] Foreign Application Priority Data

Jun. 3, 1994 [DE] Germany ............ 44 19 570.2
Mar. 23, 1995 [DE] Germany ............ 195 10 651.2

[51] Int. Cl.$^6$ ............ C08J 3/03; C08L 75/00; C09D 175/00
[52] U.S. Cl. ............ 523/324; 427/421; 428/402; 524/591; 524/839; 524/840; 528/71; 528/502 C; 528/502 E; 528/502 F
[58] Field of Search ............ 523/324; 524/591, 524/839, 840; 427/421; 528/71, 502 C, 502 E, 502 F

[56] References Cited

U.S. PATENT DOCUMENTS

| | | | |
|---|---|---|---|
| 3,437,624 | 4/1969 | Dawn | 523/300 |
| 4,857,565 | 8/1989 | Henning et al. | 523/343 |
| 4,921,842 | 5/1990 | Henning et al. | 524/839 |
| 4,996,004 | 2/1991 | Bücheler et al. | 252/314 |
| 5,008,325 | 4/1991 | Soto et al. | 528/44 |
| 5,068,280 | 11/1991 | Pal et al. | 524/728 |
| 5,075,370 | 12/1991 | Kubitza et al. | 524/591 |
| 5,116,536 | 5/1992 | Bücheler et al. | 252/314 |
| 5,252,696 | 10/1993 | Laas et al. | 528/49 |
| 5,304,400 | 4/1994 | Dhein et al. | 427/388.4 |
| 5,334,637 | 8/1994 | Zwiener et al. | 524/539 |
| 5,356,989 | 10/1994 | Tachika et al. | 524/608 |

FOREIGN PATENT DOCUMENTS

| | | |
|---|---|---|
| 2047635 | 1/1992 | Canada . |
| 2092117 | 9/1993 | Canada . |
| 2101876 | 2/1994 | Canada . |
| 1428907 | 3/1976 | United Kingdom . |

Primary Examiner—Rabon Sergent
Attorney, Agent, or Firm—Joseph C. Gil; Thomas W. Roy

[57] ABSTRACT

A method is described for the preparation of aqueous coating compositions based on resin binders containing isocyanate-reactive hydrogen atoms and polyisocyanates, by mixing the components with water, wherein the mixture is forced at a pressure of from 1 to 30 MPa through a nozzle of small size in at least one dimension.

14 Claims, 4 Drawing Sheets

AQUEOUS TWO-COMPONENT POLYURETHANE COATING COMPOSITIONS AND A METHOD FOR THEIR PREPARATION

This application is a continuation of application Ser. No. 08/448,870 filed May 24, 1995 now abandoned.

BACKGROUND OF THE INVENTION

1. Field of the Invention

The present invention relates to aqueous two-component polyurethane coating compositions having a bimodal particle size distribution and a method for their preparation using special mixing equipment.

2. Background of the Invention

Two-component polyurethane coating compositions are not mixed until shortly before application due to their limited pot life.

While in the past such two-component systems were used in the form of solutions in organic solvents, in recent years a large number of water-dispersible two-component systems have been developed. The water-dispersible two-component systems usually contain as binder a resin component containing hydroxyl groups (polyol) and a polyisocyanate component (curing agent, cross-linking agent). Such systems, which can also be used in accordance with the present invention, are disclosed, for example, in EP-A 358,979, 496,210, 469,389, 520,266, 540,985, 548,669, 562,282, 562, 436 and 583,728. A disadvantage of these two-component polyurethane coating systems is that they still require, in addition to water, a relatively high proportion of organic solvents, i.e., 15 to 25%. Another frequent disadvantage of such aqueous coating systems is that they are not capable of producing the coating quality obtained with two-component systems based on purely organic solvents.

It is known that coating dispersions having as small a particle size as possible are used to obtain high quality coating surfaces. Whereas the binder is generally capable of being dispersed in such two-component polyurethane coating systems if its particle size is sufficiently small, i.e. lower than 200 nm, the dispersion of the inherently hydrophobic isocyanate component causes considerable problems. These problems can only be partially reduced by modifying the isocyanate component to render it more hydrophilic. The reason for this is that during emulsification the isocyanate component is already stabilised on the surface of the emulsion particles as they are formed, and the stabilising layer on the surface of the particles prevents any further comminution thereof. Therefore, aqueous polyurethane coating emulsions usually have a bimodal particle size distribution with a first distribution maximum of a particle size of less than 100 nm (binder/polyol component) and a second distribution maximum of a particle size of above 10,000 nm (isocyanate component), a considerable portion of the isocyanate component having particle sizes above 20,000 nm.

Hydrophilic polyisocyanates and hydrophilic polyols have already been developed (by chemical modification), but these give rise to cured coating films having insufficient moisture resistance. Coating films having improved moisture resistance are obtained only by using hydrophobic or at most slightly hydrophilic isocyanate components.

Due to the fact that the dispersibility of the isocyanate component is restricted by the kinetics which cause the isocyanate particles to become coated with stabilising polyol, it is an object of the present invention to obtain as fine a dispersion as possible within sufficiently short times, within which no noticeable surface stabilization takes place. In particular any increase in temperature, which accelerates the reaction, must be avoided during the dispersion process.

It has now been found that this object can be achieved if, after prior mixing of the binder/polyol, the isocyanate, water and optionally solvent, emulsifiers and additives, the resulting composition is forced under high pressure through a nozzle having a small size in at least one dimension.

SUMMARY OF THE INVENTION

The present invention relates to a process for the preparation of an aqueous coating composition containing an isocyanate-reactive component and a polyisocyanate component by mixing the components with water and forcing the mixture at a pressure of 1 to 30 MPa through a nozzle of small size in at least one dimension.

The present invention also relates to a bimodal aqueous coating composition which contains in dispersed form an isocyanate-reactive component as binder and a polyisocyanate component and has a particle size distribution with a first distribution maximum at a particle size of 40 to 200 nm and a second distribution maximum at a particle size of 200 to 2,000 nm.

DETAILED DESCRIPTION OF THE INVENTION

Figure 1:
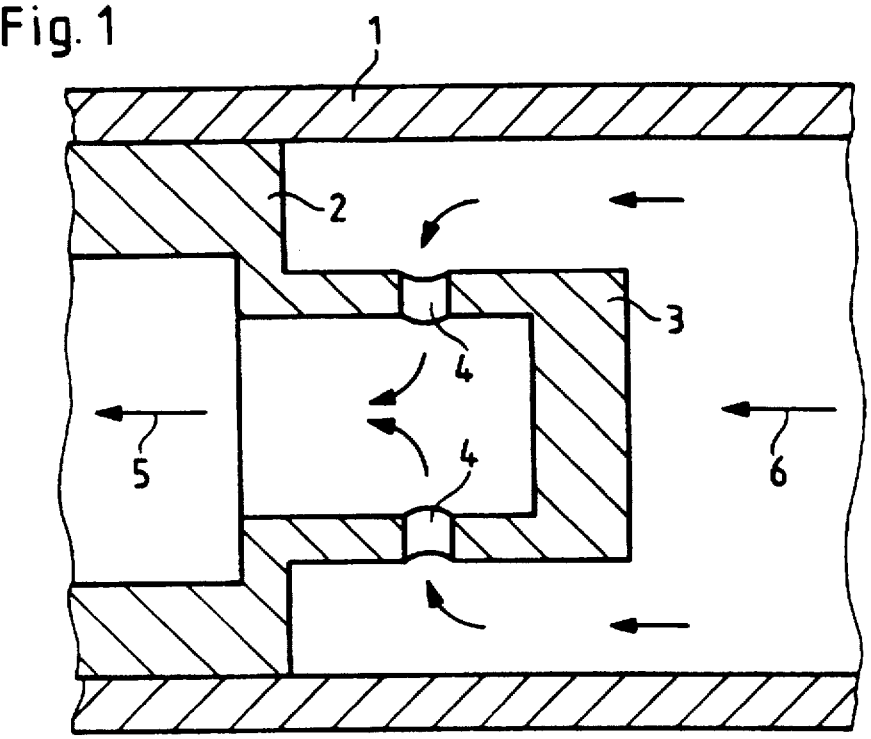
FIG. 1 is an embodiment of an emulsifying device according to the invention.

Suitable nozzles for use in accordance with the process according to the invention are slot nozzles, annular nozzles or hole-type nozzles. The small size (slot width, annular width, hole diameter) can be from approximately 0.2 to 1 mm. The nozzle sizes in the direction of flow can be one to three times, preferably one and a half times to twice, the nozzle width or diameter. Devices of this kind are known as jet dispersing machines or high-pressure homogenizers. The jet dispersing machine in accordance with EP-A 101.007 (U.S. Pat. Nos. 4,996,004 and 5,116,536, herein incorporated by reference) is especially preferred since it can be used to form very fine dispersions even at relatively low pressures.

The pressure to be applied is typically from 1 to 30 MPa (10 to 300 atmospheres), preferably 1 to 8 MPa and more preferably 2 to 6 MPa. These latter pressures are especially preferred for the jet dispersing machines.

Optionally it may be useful to employ jet dispersing machines in which several nozzles are arranged in succession, so that the emulsion is pressed through a nozzle several times within a short period. With jet dispersing machines of this kind having several nozzle passages, an increased pressure corresponding to the number of nozzles must be applied. In general, however, passage through a nozzle more than three times does not lead to any significant improvement in the emulsion.

By means of the emulsification method according to the invention, polyurethane coating emulsions can be produced which are stable for several hours and which display considerably improved surface quality following application and curing.

It is also possible to considerably reduce the content of solvent and/or hydrophiling agent in the dispersion. In particular dispersions having a solvent content of less than 15% can easily be prepared according to the invention. Depending on the pressure applied during dispersion, the number of nozzle passages and the two-component system used, it is also possible to prepare emulsions which are completely free of solvent and hydrophiling agents.

The high surface quality of the coatings which is attainable by the method according to the invention can be directly attributed to the particle size distribution in the emulsions according to the invention.

The present invention also relates to bimodal aqueous coating compositions, based on resins containing isocyanate-reactive hydrogen atoms and polyisocyanates, which have a particle size distribution with a first distribution maximum at a particle size of 40 to 200 nm and a second distribution maximum at a particle size of 200 to 2,000 nm, preferably 300 to 1,000 nm. The particle sizes of the distribution maxima differ by a factor of at least 2.

In particular 99% by weight of the particles of the emulsion according to the invention have a particle size of less than 5,000 nm.

According to the invention all isocyanate-reactive components (binders), preferably those containing hydroxyl groups, and polyisocyanate cross-linking components hitherto used in two-component polyurethane coating systems can be used. Suitable isocyanate-reactive (binder) resins are for example polyurethane resins (which can be cross-linked by polyisocyanates via the active hydrogen atoms present in the urethane groups), such as those disclosed in U.S. Pat. No. 4,711,918, herein incorporated by reference; polyacrylates having hydroxyl groups, preferably those having a molecular weight of 1,000 to 10,000, such as those disclosed in U.S. Pat. No. 5,075,370, herein incorporated by reference; and the polyester resins having hydroxy groups, which may optionally be urethane-modified, that are known from polyester and alkyd resin chemistry, such as those disclosed in U.S. Pat. No. 5,387,642, herein incorporated by reference. Preferably, hydrophilic polyols are used.

Suitable polyisocyanate components include organic polyisocyanates which have aliphatically, cycloaliphatically, araliphatically and/or aromatically bonded, free isocyanate groups, and are liquid at room temperature. The polyisocyanate component should in general have a viscosity of 20 to 2,000 mPa.s, preferably less than 1000 mPa.s and more preferably less than 500 mPa.s. Polyisocyanates having a higher viscosity or solid polyisocyanates can also be used if the viscosity of the polyisocyanate component is lowered by a corresponding content of solvent. Particularly preferred polyisocyanates are those exclusively containing aliphatically and/or cycloaliphatically bound isocyanate groups and having an average NCO functionality of 2.2 to 5.0 and a viscosity of 50 to 500 mPa.s at 23° C. If the viscosity of the polyisocyanate is sufficiently low a dispersion of sufficiently small particle size can be successfully obtained according to the invention without the addition of a solvent.

Conventional additives and modifying agents which are known for use in surface coatings may also be used in the systems according to the invention.

The present invention is not confined to the use of component systems developed especially for water-dispersible coating systems such as described, for example, in the European patent applications listed above. On the contrary it is possible according to the invention to use a large number of two-component systems previously not dispersible in water. However, in general when two-component systems developed especially for dispersion in water are used according to the invention, the energy expended to disperse these compositions, i.e., the pressure applied, is particularly favorable.

Further details and preferred embodiments of the invention are shown in the attached FIGS. 1 to 6, without limiting the general disclosure.

Figure 2:
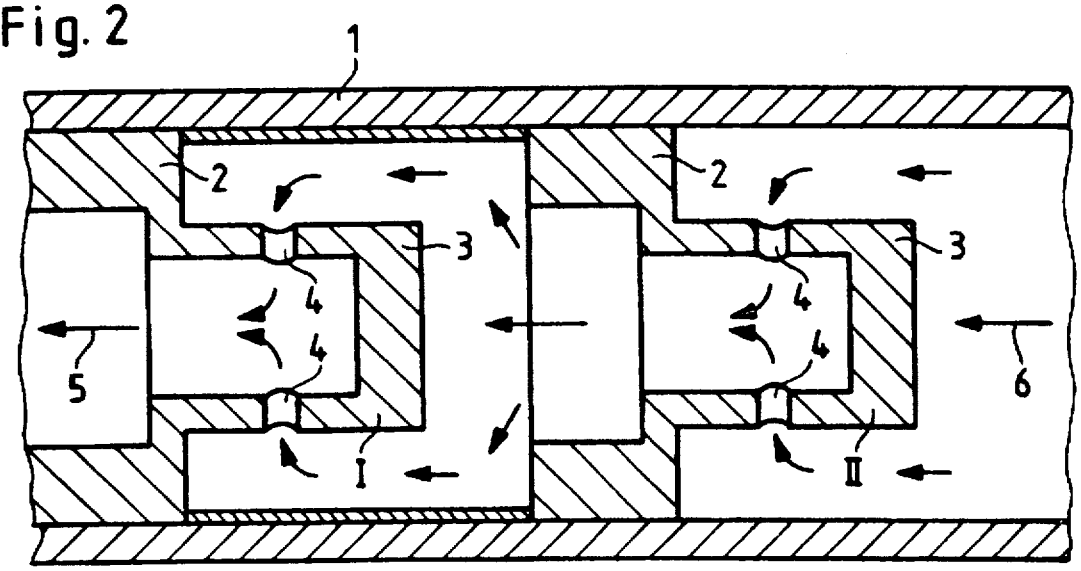
FIG. 2 is an additional embodiment of an emulsifying device according to the invention.

FIG. 1 represents a preferred emulsifying device according to the invention consisting of a tube 1 with an insert 2 which his an attachment 3 closed in the direction of flow. Attachment 3 has distributed over its circumference, radial holes 4 which act as emulsifying nozzles. The pre-emulsion is introduced under high pressure in the direction of arrow 6 and leaves the emulsifying device in the form of a fine emulsion in the direction of the arrow 5. FIG. 2 shows a device corresponding to that of FIG. 1, but with two dispersing inserts I and II arranged in succession. The holes 4 in the second emulsifying insert in the direction of the flow may optionally be holes of a smaller diameter than those in the first emulsifying attachment.

Figure 3:
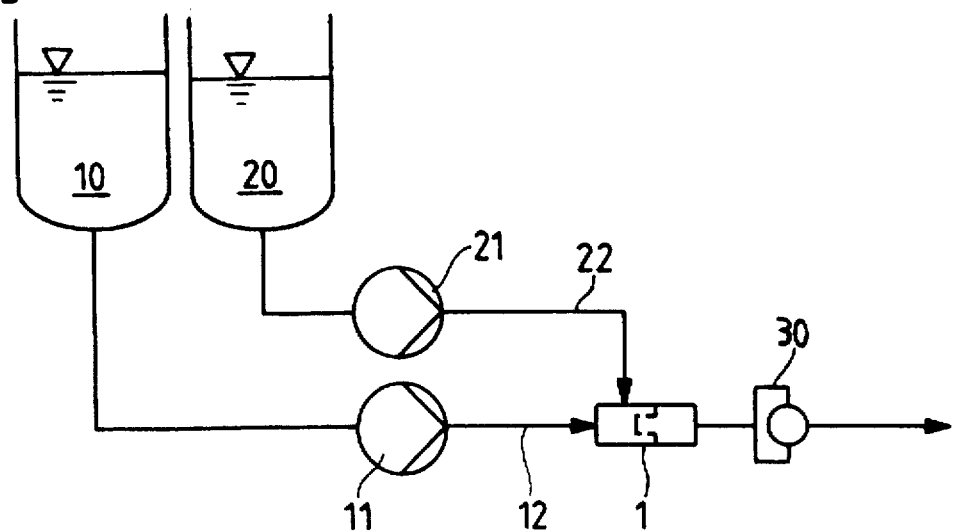
FIG. 3 is a flow chart of a first embodiment of a continuous process according to the invention.

FIG. 3 illustrates an embodiment of the method according to the invention for continuous operation. A polyol/water dispersion is fed from tank 20 by means of pump 21 via duct 22 to jet dispersing machine 1. The isocyanate component is fed from tank 10 by means of pump 11 via duct 12. Following the dispersion in jet dispersing machine 1, the coating dispersion enters coating applicator 30, for example, a spray gun. Pumps 11 and 21 transport the components at a rate calibrated against the admission pressure of the dispersing machine, so that a constant ratio of the polyol dispersion to the isocyanate component enters the jet dispersing machine 1.

Figure 4:
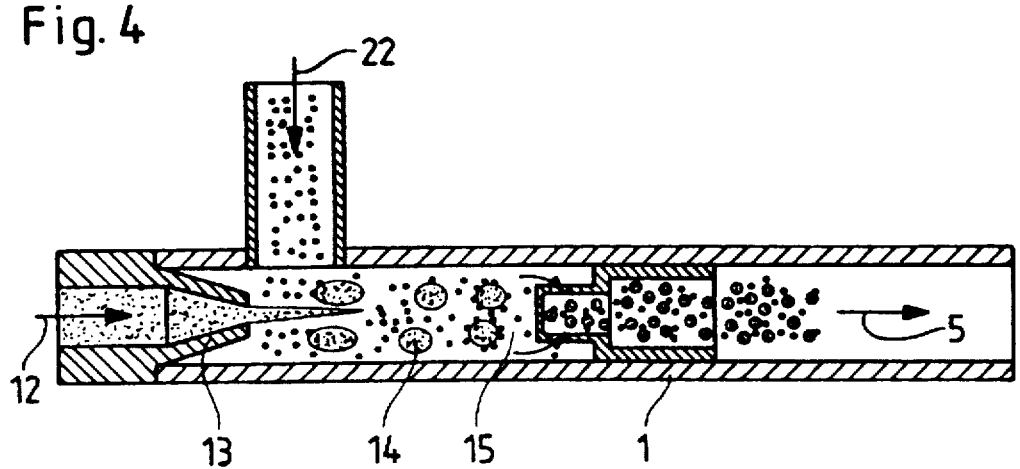
FIG. 4 is an embodiment of a jet dispersing machine used as an emulsifying device according to the invention.

FIG. 4 shows an enlarged diagram of the jet dispersing machine of FIG. 3. The polyol dispersion is introduced in the direction of arrow 22 into the pre-emulsifying chamber 15, the droplets of polyol being represented as small, open circles. The isocyanate component is introduced in the direction of the arrow 12 through the pre-dispersing nozzle 13 into the pre-dispersing chamber 15. The isocyanate component is indicated by large drops 14. After passing through the jet dispersing machine, the bimodal aqueous emulsion leaves the jet dispersing machine in the direction of arrow 5.

Figure 5:
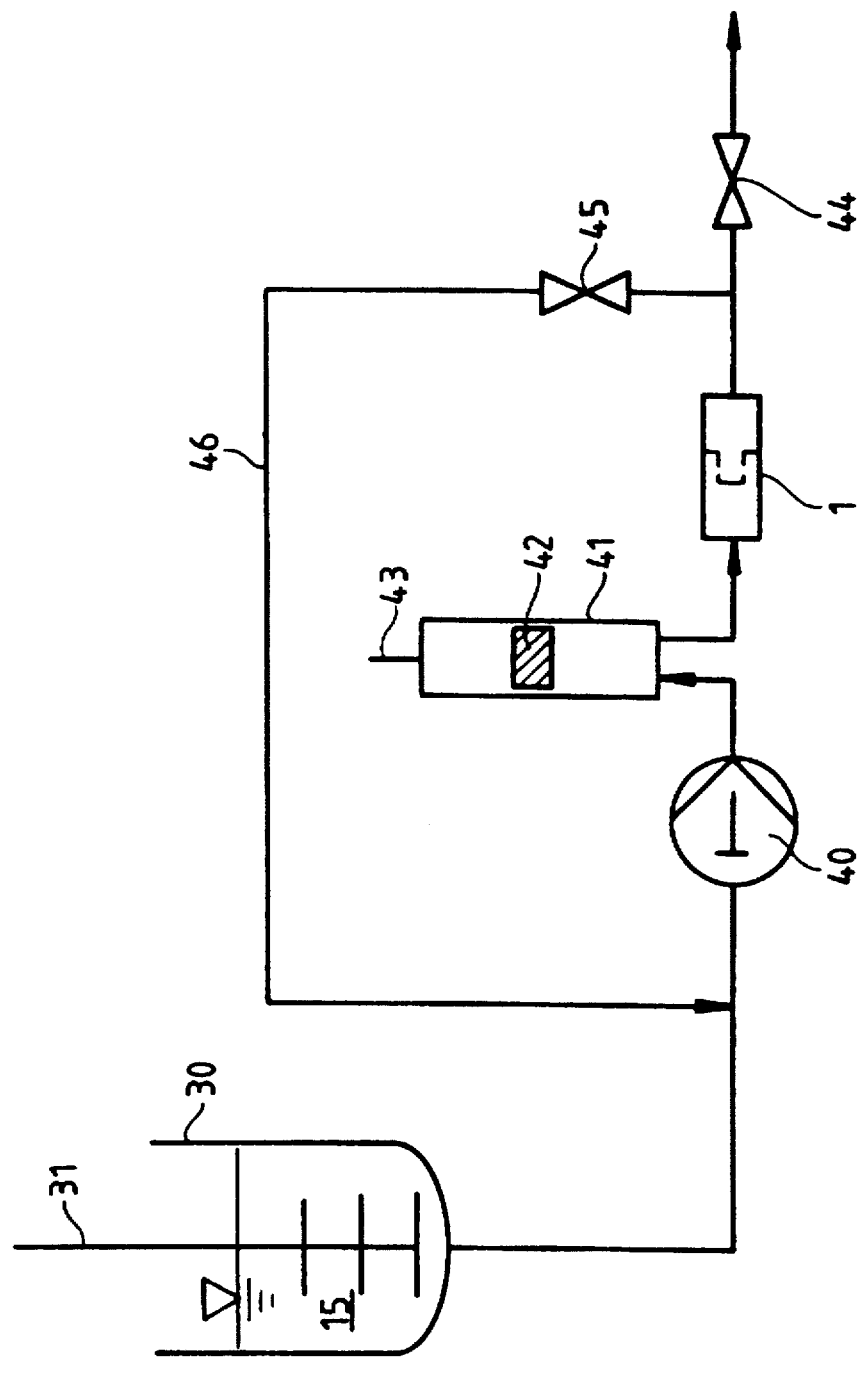
FIG. 5 is a flow chart of a second embodiment of a continuous process according to the invention.

FIG. 5 illustrates an embodiment of the method according to the invention for an intermittent coating operation. The pre-dispersion 15 is produced in a storage tank 30 by means of a stirrer 31. The pre-emulsion is fed under pressure via pump 40 to the jet dispersing machine 1 and enters the applicator (not shown), for example, a spray gun via valve 44. On interrupting the coating process by shutting valve 44, valve 45 is opened and the coating emulsion is fed back through return duct 46, so that no build-up of pressure occurs on the exit side of jet dispersing machine 1. In the embodiment illustrated in FIG. 5, the pump 40 is a simple diaphragm piston metering pump, downstream of which a piston-type accumulator 41 is arranged, through which a continuous pulsation-free supply of the pre-emulsion to jet dispersing machine 1 is ensured. The piston-type accumulator consists of a housing and a piston 42 located therein, onto the rear side 43 of which impinges a gas under constant pressure. The piston-type accumulator 41 thus compensates for the periodic flow rates of the diaphragm piston pump. Preferably the valve 45 is designed in the form of a pressure-maintaining valve which opens or shuts according to the changes in the discharge via valve 44, so that the jet dispersing machine 1 can be operated under constant conditions.

Figure 6:
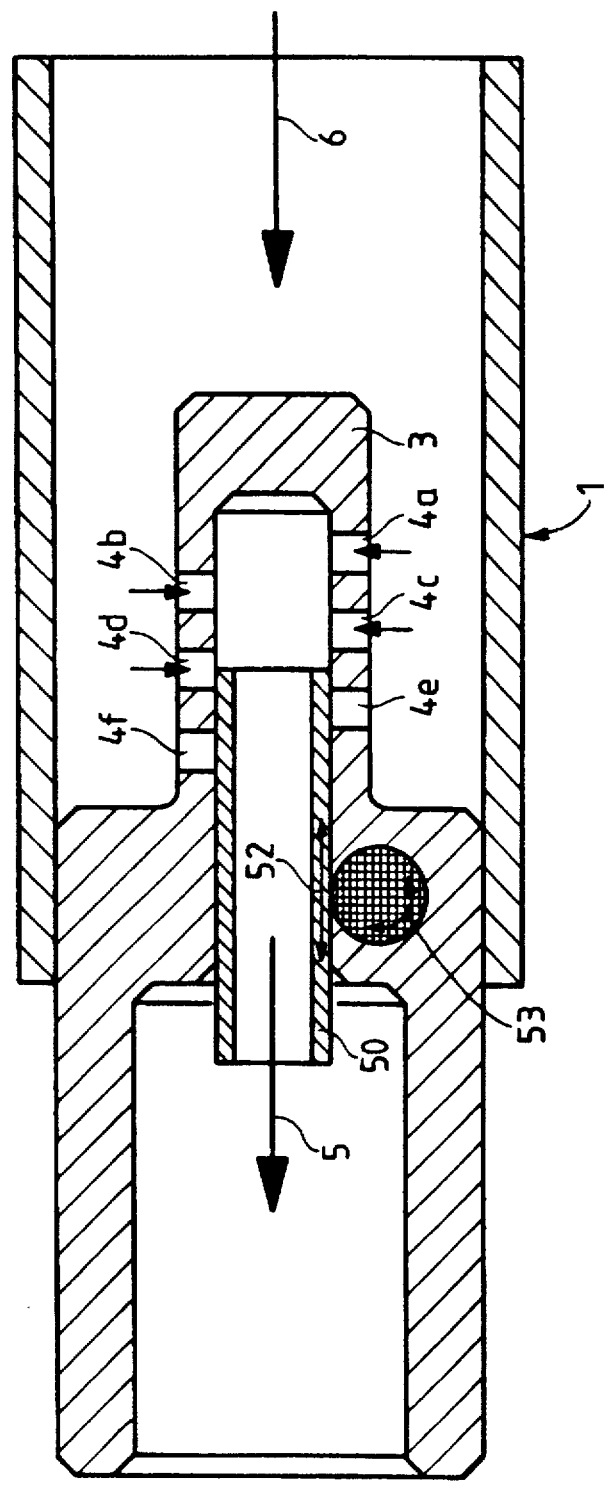
FIG. 6 is a preferred embodiment of a jet dispersing machine used as an emulsifying device according to the invention.

FIG. 6 shows another preferred embodiment of the jet dispersing machine which can be employed according to the invention. The jet dispersing machine according to FIG. 6 has several holes, 4a to 4f, staggered along the axis of insert 3. In addition on the low-pressure side 5 of the jet dispersing machine there is an inlet tube 50 which is movable by means of drive 53 in an axial direction, i.e., in the direction of arrow 52. By means of inlet tube 50 the flow rate of the emulsion can be varied by the staggered orifices 4a to 4f being successively opened or covered. In this way it is possible to establish a variable coating operation. For example, it is possible to incorporate the dispersing machine according to FIG. 6 into a spray gun and, by an appropriate mechanism, to move the inlet tube 50 directly by means of the hand lever of the spray gun. Accordingly, the dispersing machine according to FIG. 6 can be inserted into the head of the automatic coating machine on a coating production line, the metering of the coating emulsion being controlled electronically by drive 53.

EXAMPLES

I) Polyol Systems

Polyol 1: The polyol according to Example 3 of EP-A 578,940 (which corresponds to Example 3 of U.S. Pat. No. 5,349,041, herein incorporated by reference).

Polyol 2: The polyol according to Example 2 of EP-A 496,210 (which corresponds to Example 2 of U.S. Pat. No. 5,304,400, herein incorporated by reference).

II) Polyol Components

The polyol component is produced by mixing the polyol type with water.

| Polyol component | 1 | 2 | 3 |
|---|---|---|---|
| Polyol type | 1 | 1 | 2 |
| Quantity of polyol type (g) | 888 | 801 | 1908 |
| Quantity of water (g) | 900 | 1050 | 342 |
| Quantity of polyol component (g) | 1788 | 1851 | 2250 |

III) Polyisocyanate Systems

Polyisocyanate 1: Polyisocyanate 3 according to the examples of EP-A 358,979, (which corresponds to Example 3 of U.S. Pat. No. 5,075,370, herein incorporated by reference) but with a viscosity of the 100% product of about 1200 mPa.s/23° C. and an average NCO content of 22.5%.

Polyisocyanate 2: according to Example 3 of EP-A 540,985 (which corresponds to Example 3 of U.S. Pat. No. 5,252,696, herein incorporated by reference).

Polyisocyanate 3: Polyisocyanate with an isocyanurate structure based on isophorone diisocyanate, obtainable from Bayer AG, Leverkusen, under the name ®Desmodur Z 4370.

IV) Polyisocyanate Components

The polyisocyanate type is mixed with ®Baysilone OL 44, obtainable from Bayer AG, Leverkusen and optionally with butyl diglycol acetate.

| Polyisocyanate component | 1 | 2 | 3 |
|---|---|---|---|
| Polyisocyanate type | 1 | 2 | 3 |
| Quantity of polyisocyanate type (g) | 900 | 936 | 739 |
| Quantity of Baysilone ® OL 44 | 12 | 12 | 11 |
| Quantity of butyl diglycol acetate (g) | 300 | 201 | — |
| Quantity of polyisocyanate component (g) | 1212 | 1149 | 750 |

V) Preparation of the Pre-Emulsion

The polyol component is initially introduced into the machine. The polyisocyanate component is added manually over a period of 3 minutes with intensive stirring. The pre-emulsion thus formed can be used directly for the fine dispersion according to the invention.

VI) Preparation of the Emulsions

A According to the Invention

Immediately after mixing the components the pre-emulsions are forced at a pressure of 50 bars through a tube with an internal diameter of 10 mm, which contains an emulsifying insert according to FIG. 1, of which the inner tube 3 has 2 radial holes of a diameter of 0.5 mm and the thickness of the wall of the tube is 1.3 mm.

B According to the Prior Art

The pre-emulsions are continuously fed into a rotor mixing chamber with a free volume of the mixing chamber of 20 cm$^3$ and are continuously passed to a coating supply container downstream of the mixing chamber. The components are mixed by a rotor mixer with a diameter of about 20 mm at a speed of rotation of 6000 r.p.m.

C According to the Invention

The same procedure was followed as under A, with the exception that the total pressure was 20 bars.

D According to the Invention

The same procedure was followed as under A, except that the emulsifying device according to FIG. 2 was used, but with 3 identical emulsifying inserts as under A. The total pressure was 100 bars.

VII) Assessment of the Emulsions

The following tests were carried out on the resulting emulsions:

determination of the particle size distribution by measuring the Fraunhofer diffraction (light wavelength: 632 nm)

determination of the particle size distribution maxima using an ultracentrifuge, as described by H. G. M üller in Colloid Polym. Sci. 267 (1989), pp. 1113–1116.

The results are shown in the following table.

Assessment of the emulsions prepared by various emulsifying methods

| emulsion example | | particle size (μm) | | | | maxima (μm) | |
|---|---|---|---|---|---|---|---|
| preemulsion example no. | emulsifying method | <10% | <50% | <90% | <99% | | |
| 1 | A | 0.22 | 0.47 | 1.28 | 3.5 | 0.06 | 0.42 |
| 1 | B | 0.71 | 7.6 | 16.2 | 25 | 0.06 | >10 |
| 2 | A | 0.24 | 0.47 | 1 | 3 | 0.06 | 0.3 |
| 2 | B | 0.66 | 4.2 | 11.4 | 25 | 0.06 | >10 |
| 3 | A | 0.33 | 0.83 | 2.4 | 5.8 | 0.04 | 0.7 |
| 3 | B | 0.87 | 7.41 | 14 | 16.3 | 0.04 | >10 |
| 4 | C | 0.36 | 0.95 | 2.3 | 4.5 | 0.06 | 0.9 |
| 4 | D | 0.24 | 0.48 | 0.97 | 1.3 | 0.06 | 0.3 |

VIII) Production of Coatings and Methods of Assessment

The emulsions were applied to glass plates in horizontal and vertical positions using a flow cup Airmix spray gun commonly used for spray-coating. After a ventilation time of 10 mins. at room temperature the coating is dried for 10 mins. at 80° C. and then for 30 minutes at 130° C. in the same position (either horizontal or vertical).

Separate visual assessments of the coatings from the point of view of microstructure and pinholing were carried out (+=good; −=unsatisfactory). DOI (distinctness of image) values were determined in a special matching cabinet by grading the mirror image of a sample card. The DOI sample card shows a number of incompletely closed circles of various diameters to which values of 10 (largest circle) to 100 (smallest circle) are assigned in grades each consisting of 10 units. The DOI value represents the value of that circle whose mirrored image can still just be identified as being incomplete.

The results are shown in the following table:
Assessment of the coatings visually and by the DOI method

| coating of example: | | visual assessment | | | | | |
|---|---|---|---|---|---|---|---|
| | | pinholing | | micro-structure | | DOI | |
| preemulsion of example no. | emulsifying method | horiz. | vert. | horiz. | vert. | horiz. | vert. |
| 1 | A | + | + | + | + | 90 | 90 |
| 1 | B | − | − | − | − | 70 | 60 |
| 2 | A | + | + | + | + | 90 | 80 |
| 2 | B | − | − | − | − | 80 | 60 |
| 3 | A | + | + | + | + | 80 | 70 |
| 3 | B | − | − | − | − | 50 | 40 |
| 4 | C | + | + | + | + | 90 | 80 |
| 4 | D | + | + | + | + | 90 | 80 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A bimodal aqueous coating composition containing in dispersed form as binder an isocyanate-reactive component and a polyisocyanate component, in which these components have a particle size distribution having a first distribution maximum at a particle size of 40 to 200 nm and a second distribution maximum at a particle size of 200 to 2,000 nm, provided that the particle sizes of the distribution maxima differ by a factor of at least 2.

2. The coating composition of claim 1, wherein 99% by weight of the dispersed components have a particle size of less than 5000 nm.

3. A process for the preparation of an aqueous coating composition containing an isocyanate-reactive component and a polyisocyanate component by mixing the components with water and forcing the mixture at a pressure of 1 to 30 MPa through one or more nozzles having an opening of about 0.2 to 1 mm in at least one dimension.

4. The process of claim 3 wherein the nozzle size in the direction of flow is one to three times the size of said opening.

5. The process of claim 3 wherein the pressure is 1 to 8 MPa.

6. The process of claim 3 wherein the pressure is 2 to 6 MPa.

7. The process of claim 3 which comprises forcing the mixture at a pressure of 1 to 30 MPa through up to three nozzles in succession, each nozzle having an opening of about 0.2 to 1 mm in at least one dimension.

8. The process of claim 7 wherein the nozzle size in the direction of flow is one to three times the size of said opening.

9. The process of claim 7 wherein the pressure is 1 to 8 MPa.

10. The process of claim 7 wherein the pressure is 2 to 6 MPa.

11. The process of claim 3 which comprises forcing the mixture at a pressure of 1 to 30 MPa through two nozzles arranged such that their openings are arranged opposite to each other, each nozzle having an opening of about 0.2 to 1 mm in at least one dimension.

12. The process of claim 11 wherein the nozzle size in the direction of flow is one to three times the size of said opening.

13. The process of claim 11 wherein the pressure is 1 to 8 MPa.

14. The process of claim 11 wherein the pressure is 2 to 6 MPa.

* * * * *